United States Patent
McDaniel et al.

(10) Patent No.: US 10,168,682 B1
(45) Date of Patent: Jan. 1, 2019

(54) SYSTEM AND METHOD FOR MANAGING LOAD-MODIFYING DEMAND RESPONSE OF ENERGY CONSUMPTION

(71) Applicant: Wellhead Power Solutions, LLC, Sacramento, CA (US)

(72) Inventors: J. Grant McDaniel, Sacramento, CA (US); Harold E. Dittmer, San Francisco, CA (US)

(73) Assignee: Wellhead Power Solutions, LLC, Sacramento, CA (US)

( * ) Notice: Subject to any disclaimer, the term of this patent is extended or adjusted under 35 U.S.C. 154(b) by 103 days.

(21) Appl. No.: 15/356,421

(22) Filed: Nov. 18, 2016

Related U.S. Application Data

(60) Provisional application No. 62/258,367, filed on Nov. 20, 2015.

(51) Int. Cl.
| | |
|---|---|
| *G05B 19/042* | (2006.01) |
| *G06Q 30/02* | (2012.01) |
| *G06Q 50/06* | (2012.01) |
| *H02J 13/00* | (2006.01) |

(52) U.S. Cl.
CPC ....... *G05B 19/042* (2013.01); *G06Q 30/0202* (2013.01); *G06Q 50/06* (2013.01); *H02J 13/0006* (2013.01); *G05B 2219/25419* (2013.01); *G05B 2219/33056* (2013.01); *G05B 2219/40458* (2013.01)

(58) Field of Classification Search
None
See application file for complete search history.

(56) References Cited

U.S. PATENT DOCUMENTS

| | | | |
|---|---|---|---|
| 7,844,370 B2 | 11/2010 | Pollack et al. |
| 7,930,070 B2 | 4/2011 | Imes |
| 8,024,073 B2 | 9/2011 | Imes et al. |
| 8,082,065 B2 | 12/2011 | Imes et al. |
| 8,099,195 B2 | 1/2012 | Imes et al. |
| 8,108,076 B2 | 1/2012 | Imes et al. |
| (Continued) | | |

OTHER PUBLICATIONS

Piette, Mary Ann, et al. "Open Automated Demand Response Communications Specification (Version 1.0)," California Energy Commission, PIER Program, CEC-5000-2009-063, 214 pages (2009).
(Continued)

*Primary Examiner* — Carlos R Ortiz Rodriguez
(74) *Attorney, Agent, or Firm* — The Marbury Law Group, PLLC

(57) ABSTRACT

A system for providing location specific load-modifying demand response (DR) and methods for making and using same. The system advantageously can manage load on individual distribution level power circuits. Information regarding forecasted and real-time loading of individual distribution level power circuits is provided to a DR Locational Application. The DR Locational Application leverages the ability of smart devices containing real-time locational functionality, such as global positioning system, to either indicate to the consumer when it is appropriate to consume power, or automatically control the energy consumption of the smart device along with any other loads that are verified by the smart device to be in the same location. The DR Locational Application can inform the consumer, the DR Aggregator or Crowd-Source Organization, and the distribution operator of the energy consumption sum of the response for each of its distribution level circuits.

27 Claims, 13 Drawing Sheets

216

Local Schedule 214

| Period | State | Action: Reward |
|---|---|---|
| Period A | Load | Charge: Credit |
| Period B | Neutral | |
| Period C | Unload | Not Charge: Credit<br>Charge: Demerit |

(56) References Cited

U.S. PATENT DOCUMENTS

| | | |
|---|---|---|
| 8,174,381 B2 | 5/2012 | Imes et al. |
| 8,265,798 B2 | 9/2012 | Imes |
| 8,335,596 B2 | 12/2012 | Raman et al. |
| 8,396,602 B2 | 3/2013 | Imes et al. |
| 8,396,604 B2 | 3/2013 | Imes et al. |
| 8,412,382 B2 | 4/2013 | Imes et al. |
| 8,417,391 B1 | 4/2013 | Rombouts et al. |
| 8,428,782 B2 | 4/2013 | Imes |
| 8,442,695 B2 | 5/2013 | Imes et al. |
| 8,457,797 B2 | 6/2013 | Imes et al. |
| 8,463,450 B2 | 6/2013 | Martin |
| 8,473,109 B1 | 6/2013 | Imes et al. |
| 8,498,749 B2 | 7/2013 | Imes et al. |
| 8,504,180 B2 | 8/2013 | Imes et al. |
| 8,509,954 B2 | 8/2013 | Imes et al. |
| 8,571,518 B2 | 10/2013 | Imes et al. |
| 8,588,991 B1 | 11/2013 | Forbes, Jr. |
| 8,600,564 B2 | 12/2013 | Imes et al. |
| 8,626,344 B2 | 1/2014 | Imes et al. |
| 8,761,952 B2 | 6/2014 | Forbes, Jr. |
| 8,825,219 B2 | 9/2014 | Gheerardyn et al. |
| 8,849,715 B2 | 9/2014 | Forbes, Jr. |
| 8,855,794 B2 | 10/2014 | Imes et al. |
| 8,855,829 B2 | 10/2014 | Golden et al. |
| 8,855,830 B2 | 10/2014 | Imes et al. |
| 9,008,852 B2 | 4/2015 | Forbes, Jr. |
| 9,082,141 B2 | 7/2015 | Meyerhofer et al. |
| 9,125,010 B2 | 9/2015 | Meyerhofer et al. |
| 9,140,576 B2 | 9/2015 | Pamulaparthy et al. |
| 9,153,964 B2 | 10/2015 | Tyagi et al. |
| 9,164,524 B2 | 10/2015 | Imes et al. |
| 9,166,408 B2 | 10/2015 | Schmid et al. |
| 9,209,652 B2 | 12/2015 | Imes et al. |
| 9,220,058 B1 | 12/2015 | Choong |
| 2009/0187499 A1 | 7/2009 | Mulder et al. |
| 2010/0049371 A1 | 2/2010 | Martin |
| 2010/0280675 A1 | 11/2010 | Tate, Jr. et al. |
| 2011/0004358 A1 | 1/2011 | Pollack et al. |
| 2011/0046798 A1 | 2/2011 | Imes et al. |
| 2011/0054710 A1 | 3/2011 | Imes et al. |
| 2011/0125542 A1 | 5/2011 | Koch |
| 2011/0196546 A1 | 8/2011 | Muller et al. |
| 2011/0301774 A1 | 12/2011 | Koch |
| 2011/0320828 A1 | 12/2011 | Boss et al. |
| 2012/0016528 A1 | 1/2012 | Raman et al. |
| 2012/0066686 A1 | 3/2012 | Koch |
| 2012/0093141 A1 | 4/2012 | Imes et al. |
| 2012/0235646 A1 | 9/2012 | Lo et al. |
| 2012/0253567 A1 | 10/2012 | Levy et al. |
| 2012/0277920 A1 | 11/2012 | Koch |
| 2012/0330585 A1 | 12/2012 | Boot |
| 2013/0035802 A1 | 2/2013 | Khaitan et al. |
| 2013/0103221 A1 | 4/2013 | Raman et al. |
| 2013/0109410 A1 | 5/2013 | Meyerhofer et al. |
| 2013/0178993 A1 | 7/2013 | Rombouts et al. |
| 2013/0332000 A1 | 12/2013 | Imes et al. |
| 2014/0001977 A1 | 1/2014 | Zacharchuk et al. |
| 2014/0047013 A1 | 2/2014 | Koch |
| 2014/0067151 A1 | 3/2014 | Erhart et al. |
| 2014/0095091 A1 | 4/2014 | Moore et al. |
| 2014/0095410 A1 | 4/2014 | Chen et al. |
| 2014/0148963 A1 | 5/2014 | Ozog |
| 2014/0180440 A1 | 6/2014 | Behrangrad |
| 2014/0229018 A1 | 8/2014 | Steinberg |
| 2014/0277769 A1 | 9/2014 | Matsuoka et al. |
| 2014/0278794 A1 | 9/2014 | Slutsker et al. |
| 2014/0316595 A1 | 10/2014 | Kayton et al. |
| 2014/0324507 A1 | 10/2014 | Koch |
| 2014/0350743 A1 | 11/2014 | Asghari et al. |
| 2015/0005974 A1 | 1/2015 | Milenkovic et al. |
| 2015/0018985 A1 | 1/2015 | Koch et al. |
| 2015/0019032 A1 | 1/2015 | Koch et al. |
| 2015/0019037 A1 | 1/2015 | Koch |
| 2015/0019275 A1 | 1/2015 | Koch |
| 2015/0057824 A1 | 2/2015 | Gheerardyn et al. |
| 2015/0100172 A1 | 4/2015 | Forbes, Jr. |
| 2015/0105931 A1 | 4/2015 | Forbes, Jr. |
| 2015/0134280 A1 | 5/2015 | Narayan et al. |
| 2015/0142193 A1 | 5/2015 | Golden et al. |
| 2015/0170171 A1 | 6/2015 | McCurnin et al. |
| 2015/0276266 A1 | 10/2015 | Warren et al. |
| 2015/0283912 A1 | 10/2015 | Shimizu et al. |
| 2015/0372954 A1 | 12/2015 | Dubman et al. |
| 2015/0373149 A1 | 12/2015 | Lyons |
| 2015/0378381 A1 | 12/2015 | Tinnakornsrisuphap et al. |
| 2016/0047862 A1 | 2/2016 | Shimizu et al. |
| 2016/0052413 A1 | 2/2016 | Shimizu et al. |
| 2016/0055433 A1 | 2/2016 | Koch |

OTHER PUBLICATIONS

Wikipedia, "Deman Response," https://en.wikipedia.org/wiki/Demand_response, pp. 1-10, Viewed date Jan. 29, 2016.

| Time Period | State |
|---|---|
| Time Period A | Load |
| Time Period B | Neutral |
| Time Period C | Unload |

Local Schedule 214

SYSTEM AND METHOD FOR MANAGING LOAD-MODIFYING DEMAND RESPONSE OF ENERGY CONSUMPTION

CROSS-REFERENCE TO RELATED APPLICATIONS

This application claims priority to U.S. provisional patent application, Ser. No. 62/258,367, filed on Nov. 20, 2015. Priority to the provisional patent application is expressly claimed, and the disclosure of the provisional application is hereby incorporated herein by reference in its entirety and for all purposes.

FIELD

The disclosed embodiments relate generally to energy management and more particularly, but not exclusively, to systems and methods for managing load-modifying demand response (DR) of energy consumption.

BACKGROUND

Modifying consumer behavior so that power consumption is shifted from historically high-demand periods to historically low-demand periods would have a significant societal benefit from both the reduction in costs and emissions since such behavior would reduce the dependency on fossil fueled generators to produce on-demand peak energy. Additionally, demand on an electrical system at a the grid level represents the aggregate demand of all distribution level systems, but does not necessarily represent the demand of any one specific distribution system. In the same way, the demand on a distribution system represents the aggregate demand of all distribution circuits, but does not necessarily represent the demand on any specific distribution circuit. The availability of distribution circuits to accept max power ratings can vary from circuit to circuit, and day to day, depending on such factors as: the nature of the consumers on the distribution circuit, time of year, maintenance activities on the distribution system, system contingencies, and location of real-time generation.

Existing technology has attempted to address demand response (DR) behavior at the distribution system level via grid level price signals and load interruption devices. At distribution circuit level, DR behavior has generally been addressed by the use of various load interruption devices, and targeted alerts. Existing methods for addressing DR behavior at the distribution circuit level involve complex systems, in which the circuit-level location of each participating load is manually determined by a DR aggregator. The DR aggregator presents an aggregate response to the distribution operator. After the distribution operator accepts the aggregate response as acceptable, the circuit-level needs are addressed.

In view of the foregoing, there is a need for methods for managing load-modifying demand response (DR) efficiently that overcome disadvantages of existing methods.

BRIEF DESCRIPTION OF THE DRAWINGS

FIG. 3 is an exemplary diagram illustrating an embodiment of a selected local schedule of the master schedule of FIG. 2.

Figure 1:
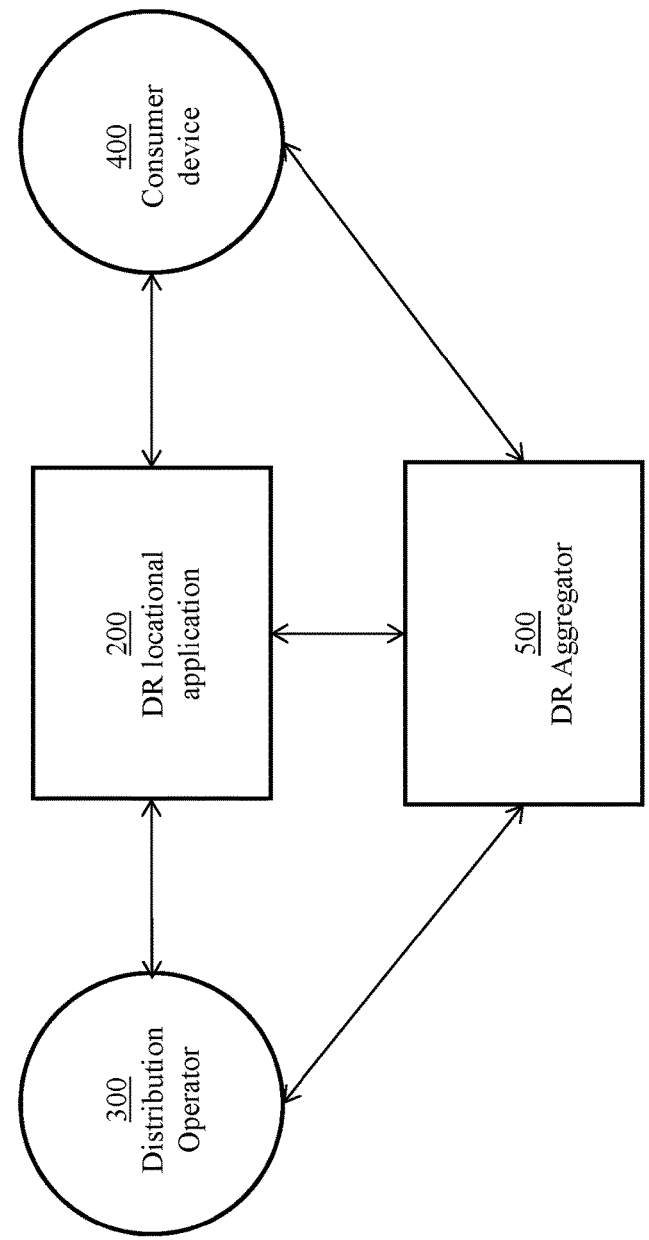
FIG. 1 is an exemplary diagram illustrating an embodiment of a demand response (DR) management system including a DR locational application and a consumer device.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available methods are incapable of managing demand response (DR) at a cost of entry and incentive level that is attractive for mass consumers, a system and method that automate management of DR and enhance incentive for individual consumers to modify behavior can prove desirable and provide a wide range of benefits, such as shifting energy consumption from high-demand periods to low-demand periods, reducing costs for energy suppliers and consumers, and reducing emissions. This result can be achieved, according to one embodiment disclosed herein, by a DR management system 100 as illustrated in FIG. 1.

Turning to FIG. 1, the DR management system 100 is shown as including a DR Locational Application 200. FIG. 1 shows that the DR Locational Application 200 as being central to other participants in the DR management system 100.

The DR management system 100 can include a distribution operator 300. The distribution operator 300 can comprise an entity for managing one or more power distribution circuits and/or supply power to selected power service locations. An exemplary distribution operator 300 can include a regional utility (and/or electricity) company.

Additionally and/or alternatively, the DR management system 100 can include a consumer device 400. The consumer device 400 can include a computer device that is configured to communicate with the DR Locational Application 200. An exemplary consumer device 400 can include a personal computer (PC), and/or a hand-held device such as a tablet computer or a smart phone.

Additionally and/or alternatively, the consumer device 400 can contain a locational tracking device (or locational service device) such as global positioning system (GPS). For example, a handheld device can be enabled with a Geographical Information System (GIS) for displaying data obtained by locational tracking device. Advantageously, the handheld device can display its own location in relation to a fixed object (such as a landmark) or a mobile object such as a friend or a vehicle). Additionally and/or alternatively, the handheld device can provide the location to the DR Locational Application 200 for presentation and/or processing.

Additionally and/or alternatively, the consumer device 400 can include a device that can be controlled hands-free. For example, the hand-held device can be controlled via speech-to-text technology, or voice control technology. Additionally and/or alternatively, the hand-held device can convey information to a user via text-to-speech technology.

The consumer device 400 can be associated with one or more energy consumption actions. For example, a consumer can consume energy by charging the consumer device 400. The DR Locational Application 200 can operate to encourage certain energy consumption actions of the consumer.

Additionally and/or alternatively, the DR management system 100 can include a DR Aggregator 500. The DR Aggregator 500 can communicate with the DR Locational Application 200 to obtain information on energy consumption associated with the consumer device 400 and provide one or more selected incentives to the consumer to encourage certain energy consumption behaviors and/or attract more consumers to utilize the DR Locational Application 200. An exemplary DR Aggregator 500 can include a scheduling coordinator, a smart-phone manufacturer, a power generator, a data center owner, and/or a high-tech firm.

In one example, the DR Aggregator 500 can be the distribution operator 300. Stated somewhat differently, the distribution operator 300 can further operate to implement functions of the DR Aggregator 500.

Although the system is shown in FIG. 1 as including one DR Aggregator 500, one distribution operator 300, and one consumer device 400, the system can include multiple (or a large number of) DR Aggregators 500, distribution operators 300, and consumer devices 400.

Figure 2:
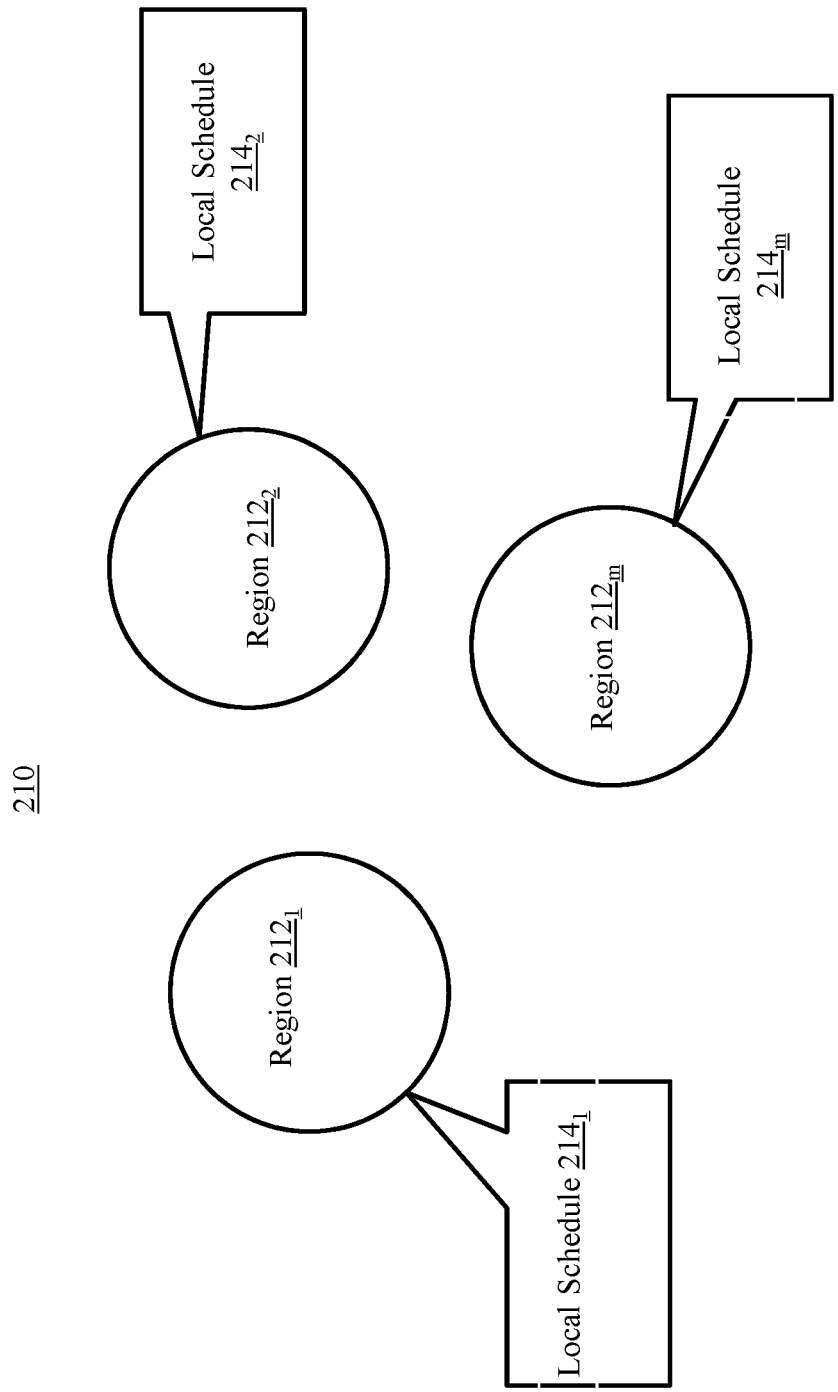
FIG. 2 is an exemplary diagram illustrating an embodiment of a master schedule obtained by the DR locational application of FIG. 1.

Turning to FIG. 2, an illustrative embodiment of a master schedule 210 is shown. The master schedule 210 can include one or more local schedules 214, each being associated with a respective geographical region 212. The region 212 can refer to a geographic region defined by one or more predetermined boundaries. The distribution operator 300 (shown in FIG. 1) can operate to manage distribution circuits (not shown) that supply energy to the respective regions 212. In certain embodiments, within a selected region 212, energy can be supplied via a uniquely-identified distribution circuit. For example, the distribution operator 300 can identify each distribution circuit using a unique identification number.

A selected local schedule 214 of the master schedule 210 can indicate energy consumption suggestions (now shown) for the associated region 212. For example, the local schedules $214_1, 214_2, \ldots, 214_m$ can indicate energy consumption suggestions for the regions $212_1, 212_2, \ldots, 212_m$, respectively.

Turning to FIG. 3, an exemplary local schedule 214 is shown. The local schedule 214 can include one or more time periods each associated with a respective state. Stated somewhat differently, the local schedule 214 can associate respective time periods with the one or more states. For example, each of time periods A, B and C shown in FIG. 3 can be represented as a time interval between two different points in time. The state can include one or more energy consumption suggestions for the consumer device 400 (shown in FIG. 1) during the associated time period.

The time periods, in one embodiment, can comprise time periods within a 24-hour cycle and that are repeated each day, or each business day, of the week. Different cycles for weekdays and weekends. The cycle could be a weekly cycle, monthly cycle, or annual cycle, for example, to account for power usage adjustments as the weather changes. Throughout the cycle, there can be uniform and/or different numbers of load, unload and/or neutral states.

As shown in FIG. 3, exemplary states can include a load state, a neutral state, and/or an unload state. In one embodiment, the exemplary states can include the load state and/or the unload state. Although FIG. 3 shows the load state, the neutral state, and the unload state as being respectively displayed as "load", "neutral", and "unload" for illustrative purposes only, the load state, a neutral state, and the unload state can be displayed using any other names and/or labels, without limitation. In certain embodiments, the load state can indicate that energy consumption is encouraged. For example, the load state in FIG. 3 corresponds to time period A. The time period A can include a low-demand period (and/or an off-peak hour), during which energy consumption does not pose a strain on the distribution circuit and cost of energy consumption is low. For example, the time period A can be determined based on historically low-demand period of energy consumption on the distribution circuit.

The unload state can indicate that energy consumption is discouraged. For example, the load state in FIG. 3 corresponds to time period C. The time period C can include a high-demand period (and/or a peak hour), during which energy consumption poses a strain on the distribution circuit and cost of energy consumption is high. For example, the time period C can be determined based on historically high-demand period of energy consumption on the distribution circuit.

The neutral state can indicate that energy consumption is neither discouraged nor encouraged. For example, the neutral state in FIG. 3 corresponds to time period B. The time period B can include a time period where demand is at a medium level (that is, not high or low).

The distribution operator 300 can push the master schedule 210 to the DR Locational Application 200, and/or send the master schedule 210 in response to a request from the DR Locational Application 200. The distribution operator 300 can generate the master schedule 210 in any conventional manner. In one example, the distribution operator 300 can generate the master schedule 210 in a GIS format. The distribution operator 300 and/or the DR Aggregator 500 can use model physics of power grid physics and present power grid data using the GIS format.

The distribution operator 300 can update the master schedule 210 at any predetermined and/or dynamicallyadjusted frequency and/or send the updated master schedule 210 to the DR Locational Application 200. The master schedule 210 preferably is updated and/or sent in a timely manner. For example, the distribution operator 300 can update and/or send the master schedule 210 on a daily basis and/or real-time basis.

The DR Locational Application 200 can send a selected local schedule 214 to the consumer device 400 based on a location of the consumer device 400. In some embodiments, the DR Locational Application 200 can obtain a location of the consumer device 400 and determine the region 212 in which the consumer device 400 is located. The DR Locational Application 200 can select the local schedule 214 associated with the region 212 and send the selected local schedule 214 to the consumer device 400.

Figure 4:
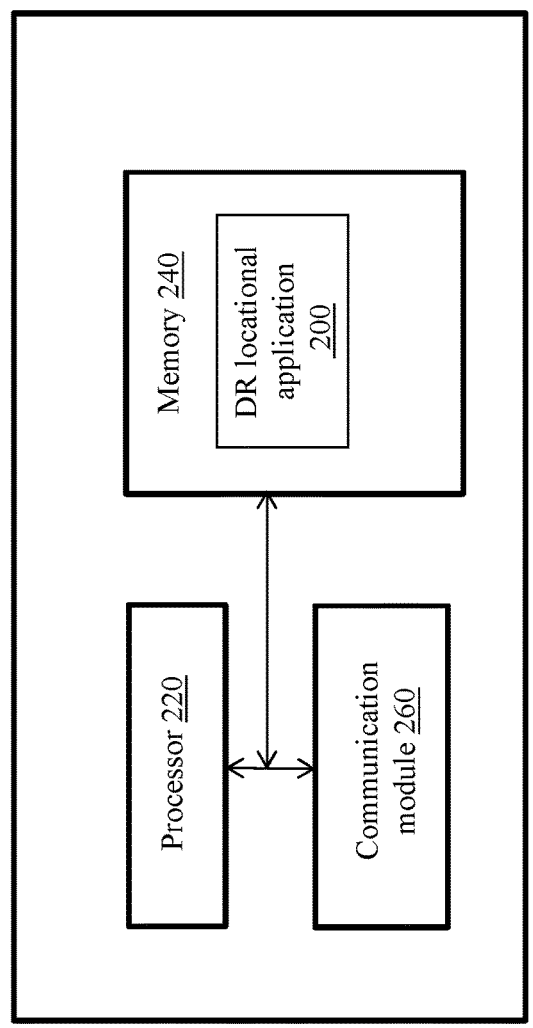
FIG. 4 is an exemplary diagram illustrating an embodiment of a DR locational application server for implementing the DR locational application of FIG. 1.

Turning to FIG. 4, a DR Locational Application server 200A for implementing the DR Locational Application 200 is shown. The DR Locational Application server 200A can include a processor 220. The processor 220 can include one or more general-purpose microprocessors (for example, single or multi-core processors), application-specific integrated circuits, application-specific instruction-set processors, graphics processing units, physics processing units, digital signal processing units, coprocessors, network processing units, encryption processing units, and the like.

As shown in FIG. 4, the DR Locational Application server 200A can include one or more additional hardware components (not shown), as desired. Exemplary additional hardware components include, but are not limited to, a memory 240 (for example, a random access memory (RAM), static RAM, dynamic RAM, read-only memory (ROM), programmable ROM, erasable programmable ROM, electrically erasable programmable ROM, flash memory, secure digital (SD) card, etc.) Server-side instructions of the DR Locational Application 200 can be stored on the memory 240 to be executed by the processor 220.

Additionally and/or alternatively, the DR Locational Application server 200A can include a communication module 260. An exemplary communication module 260 can include a transmitter, a receiver, a transceiver, and/or a radio frequency (RF) circuitry that can receive and/or transmit information wirelessly.

The communication module 260 can operate to exchange data and/or instruction between the DR Locational Application 200 and another participant in the DR management system 100 (shown in FIG. 1) using any wired and/or wireless communication methods. For example, the DR Locational Application server 200A can receive the master schedule 210 from the distribution operator 300 via the communication module 260. Exemplary communication methods include, for example, radio, Wireless Fidelity (Wi-Fi), cellular, satellite, and broadcasting.

The processor 220, the memory 240, and/or the communication module 260 can be configured to communicate, for example, using hardware connectors and buses and/or in a wireless manner.

Figure 5:
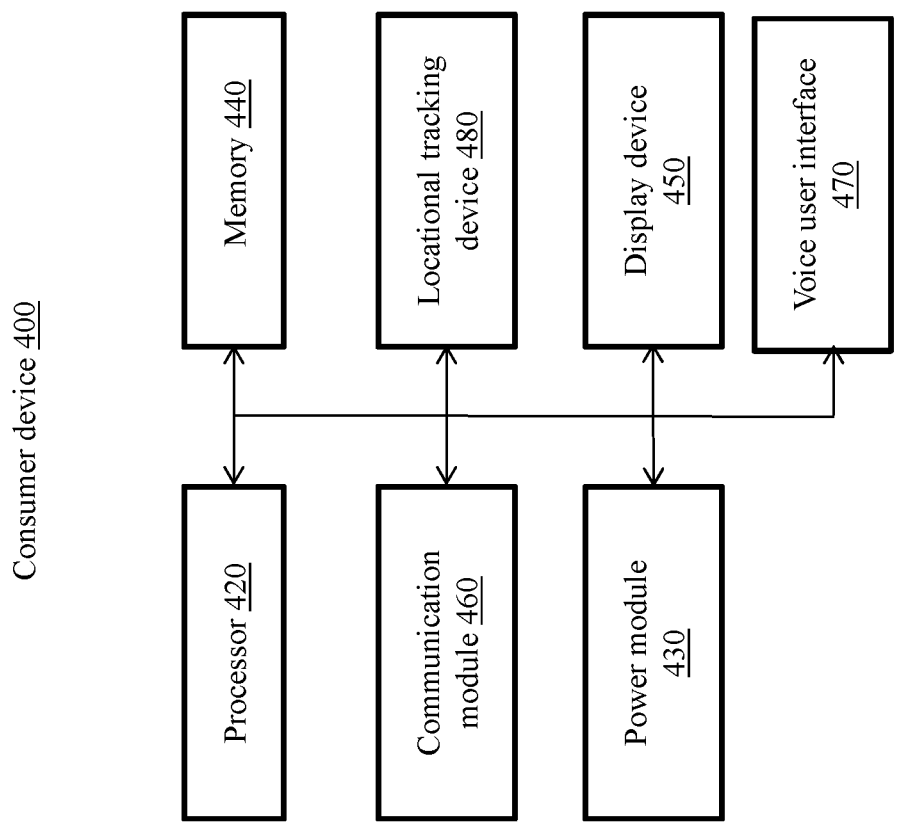
FIG. 5 is an exemplary diagram illustrating an embodiment of the consumer device of FIG. 1.

Turning to FIG. 5, an exemplary consumer device 400 is shown. The consumer device 400 can include a processor 420. The processor 420 can be provided in a similar manner as the processor 220 (shown in FIG. 4). The consumer device 400 can include a memory 440. The memory 440 can be provided in a similar manner as the memory 240 (shown in FIG. 4). Coded instructions of the DR Locational Application 200 can be installed on the memory 440, to be executed by the processor 420. The consumer device 400 can include a communication module 460. The communication module 460 can be provided in a similar manner as the communication module 260 (shown in FIG. 4).

Additionally and/or alternatively, the consumer device 400 can include a locational tracking device 480. The locational tracking device 480 can include any device that is integrated onboard the consumer device 400 and that operates to obtain a location of the consumer device 400. An exemplary locational tracking device 480 can include a GPS module. In certain embodiments, the locational tracking device 480 can obtain the location of the consumer device 400 in real time.

Without the locational tracking device 480, if the consumer device 400 participates in DR management program, the consumer device 400 may need to register with an energy supplier and/or aggregator as being bound with a specific distribution circuit. Participation of the consumer device 400 can be limited to a certain location. Using the disclosed system 100, the consumer device 400 can be incentivized at any location and in real-time.

Additionally and/or alternatively, the consumer device 400 can include a power module 430. An exemplary power module 430 can include a battery for providing electric power to operate the consumer device 400. The battery can be rechargeable. In one example, the power module 430 can include a smart battery (not shown). The smart battery can allow an operating system of the consumer device 400 to perform power management operations based on remaining estimated run times by determining accurate readings on status of the battery, such as current, voltage, state of charge and/or capacity. Additionally and/or alternatively, the operating systems can turn on and/or off charging of the battery and/or control charge rate of the battery. In one embodiment, the operating systems can turn on and/or off charging of the battery and/or control charge rate of the battery at least partially based on the local schedule 214.

Additionally and/or alternatively, the consumer device 400 can include a display device 450. The display device 450 can include any device that operates to provide images presenting the local schedule 214 in a predetermined manner, such as displaying a selected portion of the local schedule 214 or the entire local schedule 214. Advantageously, a user can be informed of energy consumption recommendation by viewing the local schedule 214 and modify energy consumption behavior based on the local schedule 214. An exemplary display device 450 can include a touch screen.

Additionally and/or alternatively, the display device 450 can present the master schedule 210 in a predetermined manner, such as in a GIS format. A user of the consumer device 400 can select a location for energy consumption activity, such as charging the consumer device 400 or a vehicle (not shown). Advantageously, when the user is mobile (such as during a road trip), the user can still make an informed decision of energy consumption and save energy cost.

Additionally and/or alternatively, the consumer device 400 can include a voice user interface 470. Exemplary voice user interface 470 can include a voice analyzer and command recognition circuit (not shown) for evaluating characteristics of human voices, such as the amplitude-vs.-frequency function or the amplitude-vs.-time function, e.g. with a filter for passing, suppressing, or modifying voice frequencies. Additionally and/or alternatively, exemplary voice user interface 470 can include any voice recognition software to be implemented by the processor 420. The voice user interface 470 can extract instruction from voice of a user speaking to the microphone and provide such instruction the processor 420. The processor 420 can control the other components of the consumer device 400 based on the instruction. Advantageously, a user can be informed of energy consumption recommendation by viewing the local schedule 214 and voice control the charging of the consumer device 400 based on the local schedule 214.

Additionally and/or alternatively, exemplary voice user interface 470 can include an audio frequency signal generator to provide an audio frequency carrier signal and a speech synthesizer to modulate the carrier signal in accordance with units of information (e. g. words or syllables) and add timbre to thereby generate a signal that is an electronic representation of the spoken units of information, which can be transmitted via a speaker installed onboard, or coupled with, the consumer device 400. The speech synthesizer can translate signals (e.g. binary digital signals) from the processor 420, for example, into audible, coherent spoken words, phrases or sentences. Advantageously, the voice user interface 470 can translate information into a voice signal and present the voice signal via the speaker. Advantageously, the consumer device 400 can inform a user of energy consumption recommendation by generating speech to convey the local schedule 214. The consumer device 400 can instruct an appliance 400A (shown in FIG. 9) by voice to operate based on energy consumption recommendation based on the local schedule 214.

The processor 420, the memory 440, the communication module 460, the locational tracking device 480, the power module 430, the display device 450, and/or the voice user interface 470 can be configured to communicate, for example, using hardware connectors and buses and/or in a wireless manner.

Figure 6:
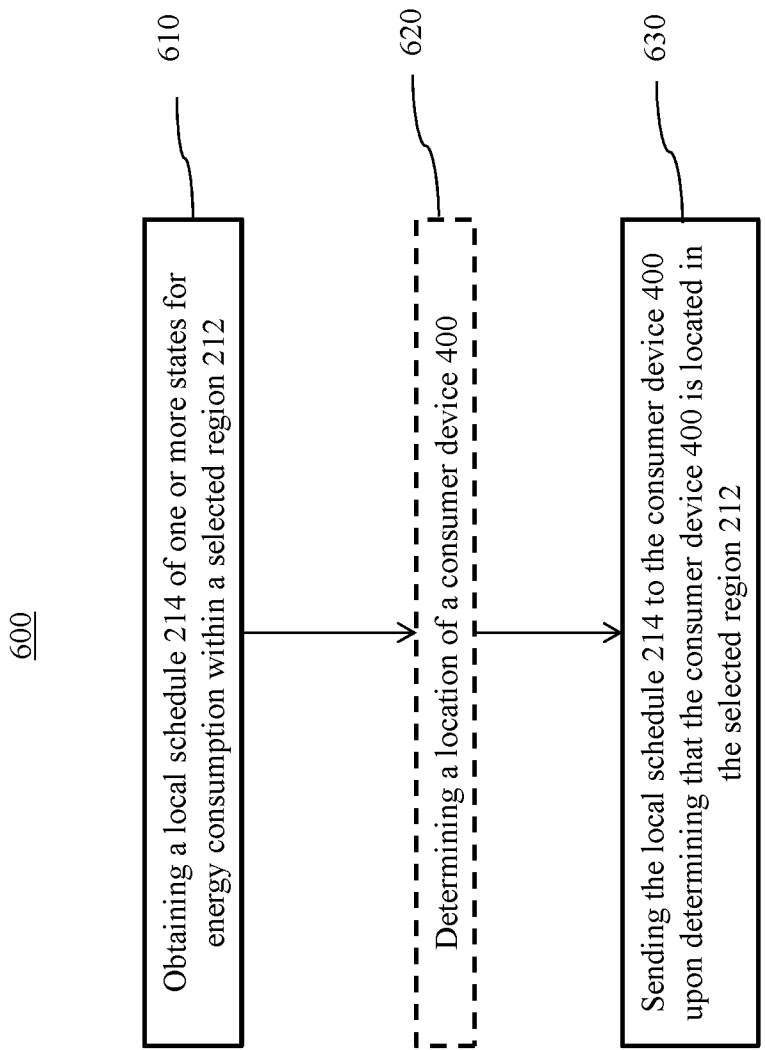
FIG. 6 is an exemplary flow chart illustrating an embodiment of a method for managing DR via the DR locational application of FIG. 1.

Turning to FIG. 6, a method 600 for managing DR is shown. The method 600 can be implemented by the DR Locational Application 200 on the DR Locational Application server 200A. The DR Locational Application 200 can obtain, at 610, the local schedule 214 (shown in FIG. 2) of one or more states for energy consumption on distribution circuits within a selected region 212. For example, the DR Locational Application 200 can receive the local schedule 214 from the distribution operator 300 (shown in FIG. 1) and/or retrieve the local schedule 214 pre-stored on the memory 240 (shown in FIG. 4). The distribution operator 300 can serve the distribution circuits within the selected region 212.

The DR Locational Application 200 can send, at 630, the local schedule 214 to the consumer device 400 upon determining that the consumer device 400 is located in the selected region 212. Stated somewhat differently, the DR Locational Application 200 can send the local schedule 214 to the consumer device 400 based on a location of the consumer device 400.

Optionally, the DR Locational Application 200 can determine, at 620, a location of the consumer device 400. In one embodiment, the DR Locational Application 200 can determine the location of the consumer device 400 via the locational tracking device 480 (shown in FIG. 5) onboard the consumer device 400. Stated somewhat differently, the locational tracking device 480 can detect the location of the consumer device 400 and the consumer device 400 can inform the DR Locational Application 200 of the location.

Figure 7:
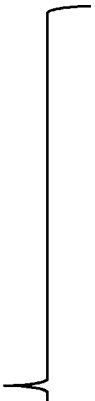
FIG. 7 is an exemplary diagram illustrating an embodiment of an incentive plan for the consumer device of FIG. 1.

Turning to FIG. 7, an exemplary embodiment of an incentive plan 216 is shown. The incentive plan 216 can be based on the local schedule 214. For a selected state in the local schedule 214, an action of the consumer device 400 can result in an appropriate reward. Stated somewhat differently, the DR Locational Application 200 can assign the appropriate reward to the consumer device 400 for the action. The reward can include a positive reward, such as a credit, and/or a negative reward, such as a demerit, that, in some instances, can cancel out certain positive reward. For example, when the consumer device 400 takes an action that is encouraged according to the state at a given moment, the action can result in a positive reward.

The credit and/or demerit can be provided in any predetermined unit and/or can be unit-less. Amount of a credit and a demerit can be uniform and/or different. The credit and/or the demerit can be measured in integers and/or non-integer values. In a non-limiting example, the absolute value of a credit can equal to a half of an absolute value of a demerit, so an action inconsistent with the state can result in a significant negative reward and can advantageously be discouraged.

As shown in FIG. 7, when the consumer device 400 charges during period A, corresponding to a load state, the charging results in a credit. When the consumer device 400 does not charge during period C, corresponding to an unload state, the "not charging" results in a credit. When the consumer device 400 charges during period C, the charging results in a full demerit. When charging of the consumer device 400 is set up so that charging can be interrupted during the "unload" period, the "permission to interrupt" can earn a full credit. During "neutral" periods, the application does not provide credits or demerits.

In one example, prior to sending the local schedule 214 to the consumer device 400, the DR Locational Application 200 can compile corresponding action and reward with the local schedule 214 to generate the incentive plan 216 and send the incentive plan 216. In another example, the DR Locational Application 200 can inform the consumer device 400 of the corresponding action and reward via a separate notification. A consumer can consume energy based on knowledge of the actions and rewards. Regardless of how the consumer device 400 learns of the actions and rewards, a consumer can adjust energy consumption behavior under a motivation to earn positive reward.

Figure 8:
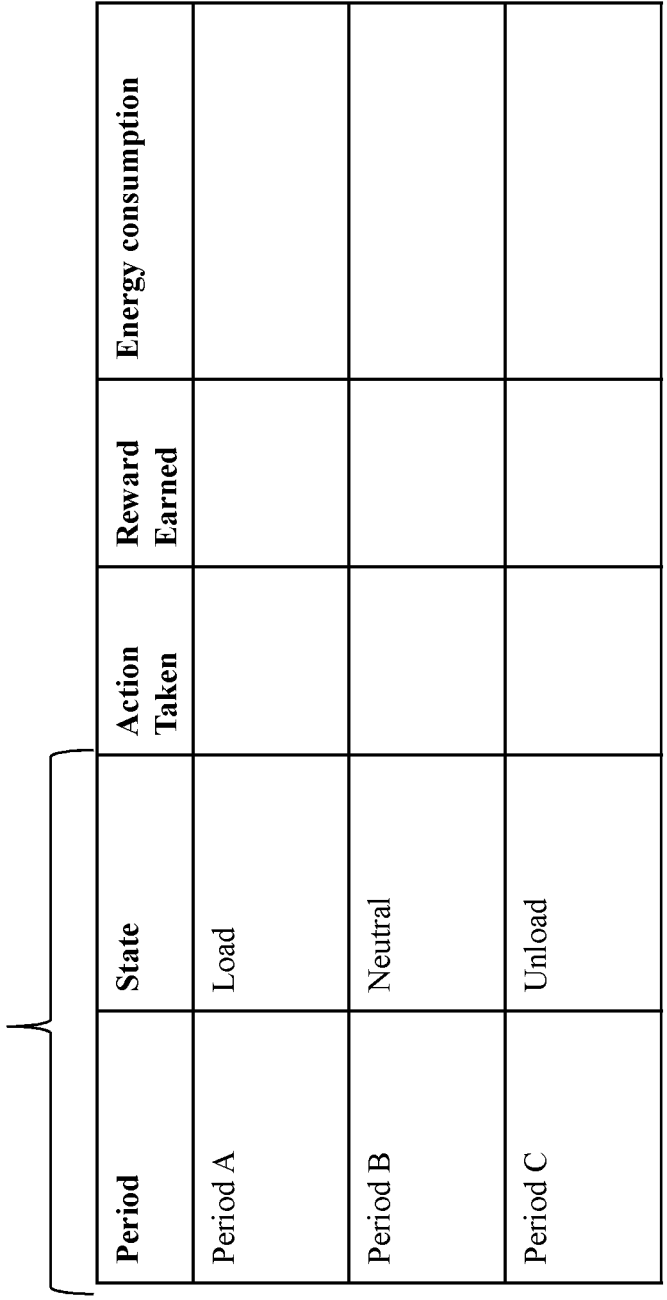
FIG. 8 is an exemplary diagram illustrating an embodiment of energy consumption activity data of the consumer device of FIG. 1.

Turning to FIG. 8, energy consumption activity data 218 of the consumer device 400 is shown. The energy consumption activity data 218 can include actual action associated with the consumer device 400. Stated somewhat differently, the energy consumption activity data 218 can indicate an action of energy consumption associated with the consumer device within at least one of the time periods in the local schedule 214. In one example, the action can include "charging" or "not charging" of the consumer device 400.

Energy consumption by the action can be obtained in any suitable way. In one example, the energy consumption can be based on a product of wattage of the power module 430 (shown in FIG. 5) and duration of charging. In another example, the consumer device 400 can directly read battery state of charge from the power module 430 to obtain the energy consumption for charging the power module 430. Additionally and/or alternatively, the energy consumption activity data 218 can include reward earned based the action taken (shown in FIG. 7).

The energy consumption activity data 218 can be at least partially obtained by the consumer device 400. In one embodiment, the energy consumption and action taken can be obtained by the consumer device 400 and sent to the DR Locational Application 200. The DR Locational Application 200 can calculate the reward earned. Additionally and/or alternatively, the consumer device 400 can calculate the reward earned and send the reward earned to the DR Locational Application 200.

Figure 9:
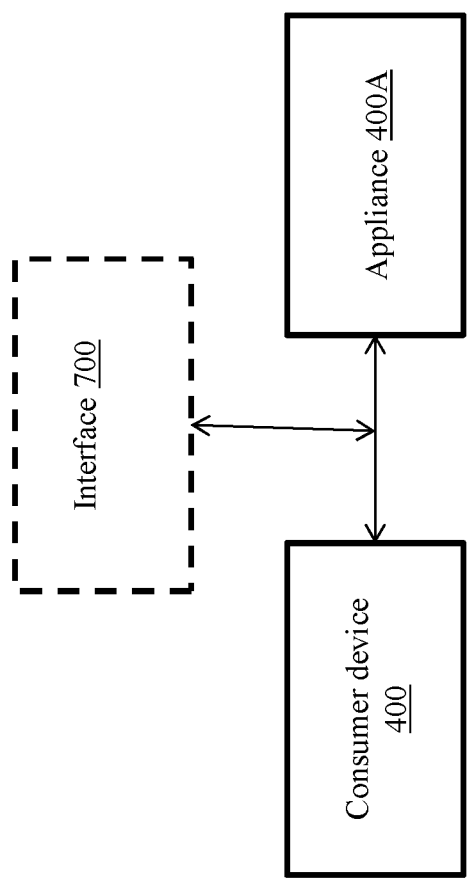
FIG. 9 is an exemplary diagram illustrating an alternative embodiment of the consumer device of FIG. 1, wherein the consumer device communicates with an appliance.

Turning to FIG. 9, the consumer device 400 can be associated with an appliance 400A. The consumer device 400 can be configured to communicate with the appliance 400A and/or provide operation instructions to the appliance 400A. The appliance 400A can include a device that operates on electric energy. In one embodiment, the appliance 400A can be enabled for voice control. An exemplary appliance 400A can include television, dishwasher, laundry machine, dryer, air-conditioner, oven range, lighting system, entertainment system, electric vehicle, and/or the like. For example, the appliance 400A can include a smart speaker that can optionally be voice controlled.

Although FIG. 9 shows one appliance 400A for illustrative purposes only, the consumer device 400 can be associated with any number of appliances 400A. In one embodiment, one or more appliances 400A can be in communication or controlled by the consumer device 400 via an automation control platform and the consumer device 400 can advantageously have a software application (such as an app) installed onboard to implement the automation control platform.

The consumer device 400 can obtain operation information, such as an operation status and/or energy consumption, of the appliance 400A at any selected time. In one example, the consumer device 400 and the appliance 400A can communicate via one or more wired and/or wireless methods, such as Bluetooth, cellular communications and/or Wi-Fi. The appliance 400A can be within the wireless range of the consumer device 400 and registered with the DR Locational Application 200. The appliance 400A can be scheduled and/or controlled from the consumer device 400. For example, the consumer device 400 can be capable of interrupting selected loads during "unload" periods. The appliance 400A may be eligible to be a qualifying device to participate in the usage of the DR Locational Application 200.

When communication between the consumer device 400 and the appliance 400A includes a local area wireless computer networking technology, the consumer device 400 and the appliance 400A can be placed in proximity to each other so that the appliance 400A can be located in the same distribution network as the consumer device 400. The local schedule 214 and the incentive plan 216 (shown in FIG. 7) can be applicable to the appliance 400A. Additionally and/or alternatively, the consumer device 400 can obtain the amount of power consumption by the appliance 400A. The energy consumption in the energy consumption activity data 218 associated with the consumer device 400 can thus list respective amounts of energy consumption by the appliance 400A and the consumer device 400.

In certain embodiments, the consumer device 400 can control operation status and/or energy consumption of the appliance 400A at a selected time. For example, during period of unload state, the consumer device 400 can interrupt operation of the appliance 400A to comply with the local schedule 214. Stated somewhat differently, the consumer device 400 can control the appliance 400A at least partially based on the local schedule 214.

As shown in FIG. 9, the consumer device 400 and the appliance 400A can be in communication with an (optional) interface 700. In one embodiment, the interface 700 can include the communication network between the consumer device 400 and the appliance 400A.

Additionally and/or alternatively, the interface 700 can include any hardware instructed by software to receive instructions from the consumer device 400 and configure the appliance 400A to turn on, turn off, operate at a selected mode, and/or the like. The interface device 700 between the consumer device 400 and the appliance 400A can be implemented using any conventional control technique, such as via control techniques available from manufacturers such as Apple Inc. (located in Cupertino, Calif.), Open Access Technology International, Inc. (located in Minneapolis, Minn.), and/or thePeoplesPower C.I.C. (located in England, United Kingdom). In one embodiment, the interface 700 can include an Insteon Hub (commercially available from Insteon Inc., located in Irvine, Calif.).

Although FIG. 9 shows the interface 700 as being an individual unit, the interface 700 can be at least partially integrated with the consumer device 400 and/or the appliance 400A. In one embodiment, the interface 700 can include a software program (such as an application or app) on the consumer device 400 to access the schedule 214. For example, the software program can access the schedule 214 via appropriate configuration with an application programming interface (API). Additionally and/or alternatively, the interface 700 can include a microcontroller on the appliance 400A to receive instruction from the software program on the consumer device 400.

Figure 10:
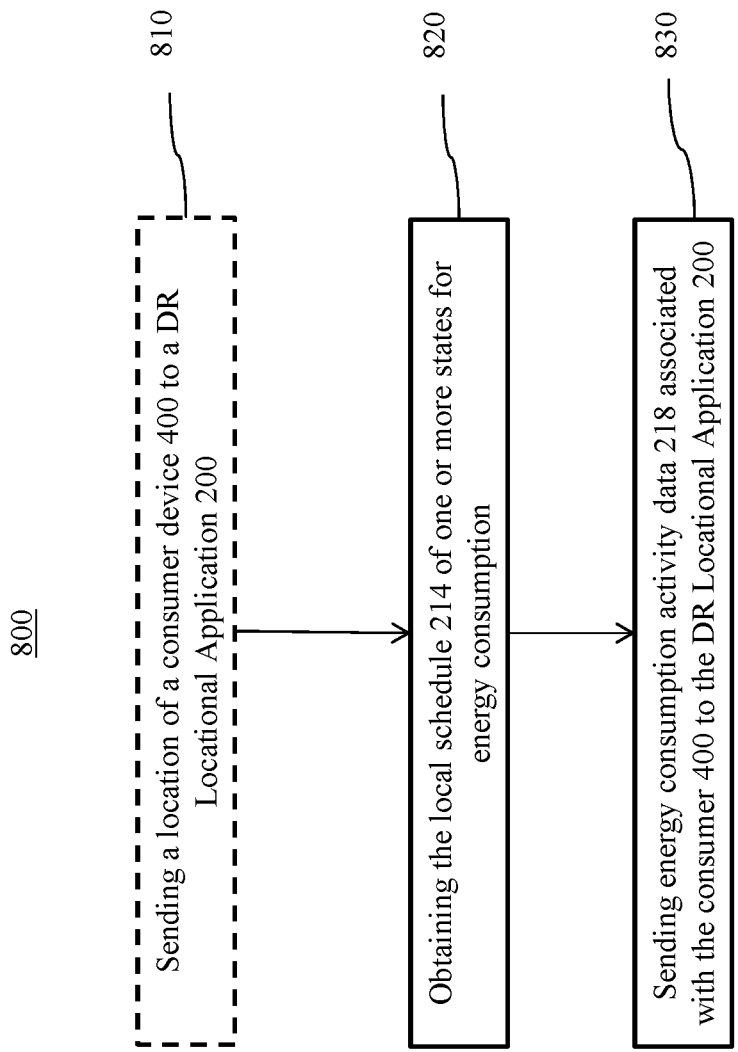
FIG. 10 is an exemplary flow chart illustrating an embodiment of a method for managing DR via the consumer device of FIG. 1.

Turning to FIG. 10, a method 800 for managing DR is shown. The method 800 can be implemented by the consumer device 400. Optionally, the location of the consumer device 400 can be sent, at 810, to the DR Locational Application 200. The consumer device 400 can obtain, at 820, the local schedule 214 of one or more states for energy consumption from the DR Locational Application 200. The consumer device 400 can send, at 830, energy consumption associated with the consumer device 400 to the DR Locational Application 200.

The DR Locational Application 200 can send the energy consumption associated with the consumer device 400 to the distribution operator 300 and/or the DR Aggregator 500. The DR Aggregator 500 can provide selected payments and/or incentives based on the reward earned (shown in FIG. 8) in order to encourage certain consumer behavior and/or attract more consumers to join to use the DR Locational Application 200. In one example, the incentives can include cash payments, on-line credits, discounts, and/or the like.

Figure 11:
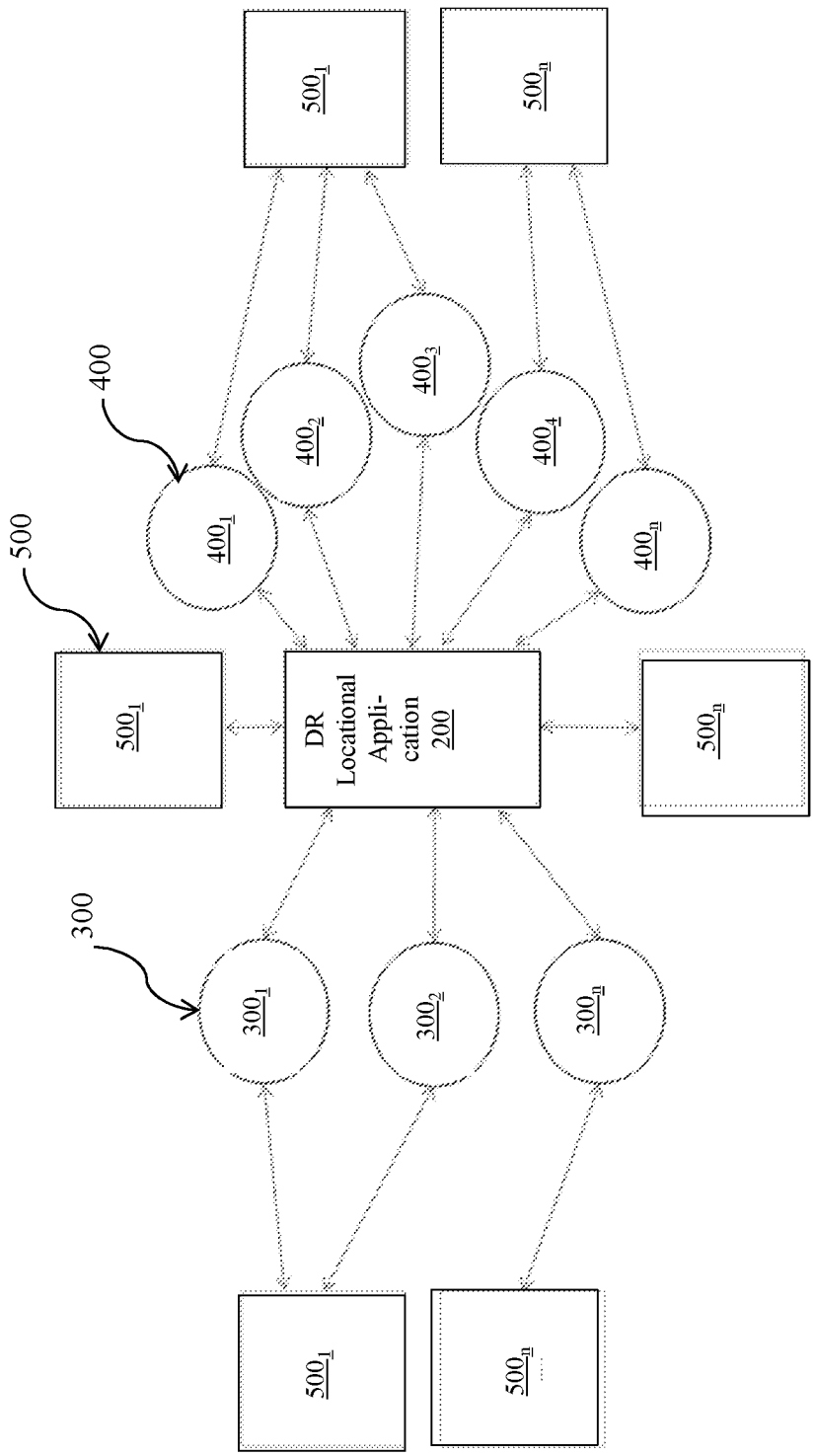
FIG. 11 is an exemplary diagram illustrating an alternative embodiment of the DR management system of FIG. 1, wherein the system includes a plurality of consumer devices, DR aggregators and distribution operators.

Turning to FIG. 11, the DR management system 100 can include a plurality of distribution operators 300 ($300_1, \ldots, 300_n$), consumer devices 400 ($400_1, \ldots, 400_n$) and/or DR Aggregators 500 ($500_1, \ldots, 500_n$). The DR Aggregator 500 can negotiate an agreement with one or more distribution operators 300. In one example, the distribution operator 300 does not necessarily pay a fee to interface with the DR locational Application 200. The DR Aggregator 500 may pay a fee to use the DR locational Application 200.

A consumer can access the DR Locational Application 200 and register a mobile device with locational services (such as a smart phone with GPS module) for free. In one example, the consumer can select a certain DR Aggregator 500 that best fits his/her needs as their default aggregator. For example, the consumer can select a DR Aggregator 500 with ability to roam aggregator if the device is mobile.

Figure 12:
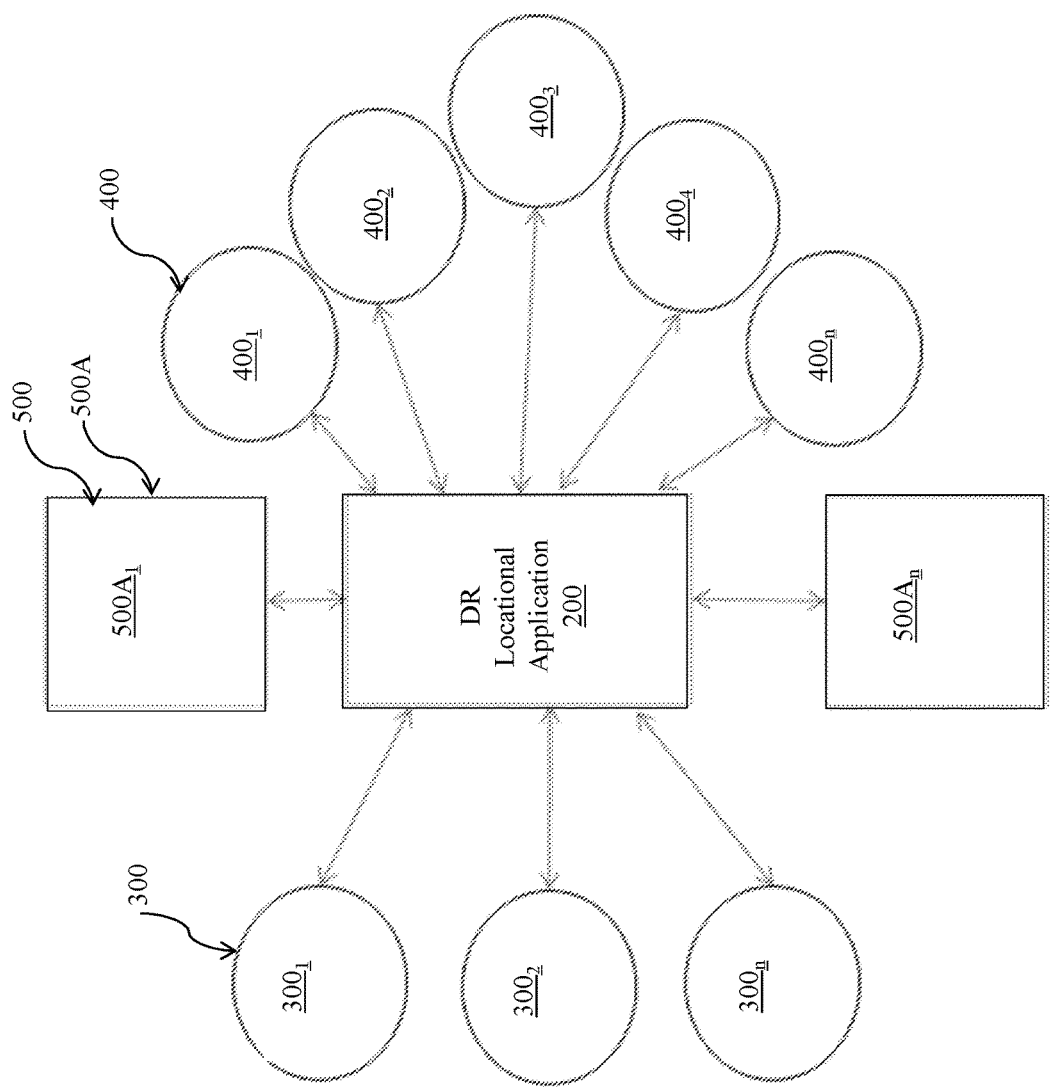
FIG. 12 is an exemplary diagram illustrating an alternative embodiment of the DR management system of FIG. 11, wherein the system includes a plurality of consumer devices, crowd-sourcing organizations and distribution operators.

Turning to FIG. 12, the DR Locational Application 200 can be used specifically for limited-time crowd-source funding efforts. Crowd-source funding is particularly well-suited to attract large numbers of consumers to participate in DR programs because, although the value to any one individual consumer is very small, the value in aggregate can be quite large. In the crowd-source funding topology, the DR Location Application Provider 200 can have pre-arranged terms with each Distribution Operator 300 for short term DR Programs.

The DR Locational Application 200 can support incentive programs, such as crowd-sourcing for a limited time for a specific goal. FIG. 12 shown as including a plurality of Crowd-Source Organizations 500A (500A$_1$, ..., 500A$_n$). The Crowd-Source Organization 500A can be a specific type of the DR Aggregator 500. The Crowd-Source Organization 500A, for example, can be a non-profit organization and can register a funding program with the DR Locational Application 200 for a limited time as defined by the agreement with the Distribution Operator 300. Once registered, the Crowd-Source Organization 500A can invite consumers to participate at no cost to the consumer. The consumer can register the consumer device 400, and any other qualifying devices (or appliances 400A) attached to the consumer device 400, by accepting the invitation from the Crowd-Source Organization 500A. An exemplary invitation can be generated by the Crowd-Source Organization 500A and send to selected consumers via any communication methods, such as mail-in advertisement, social media, electronic mail, and/or the like.

Figure 13:
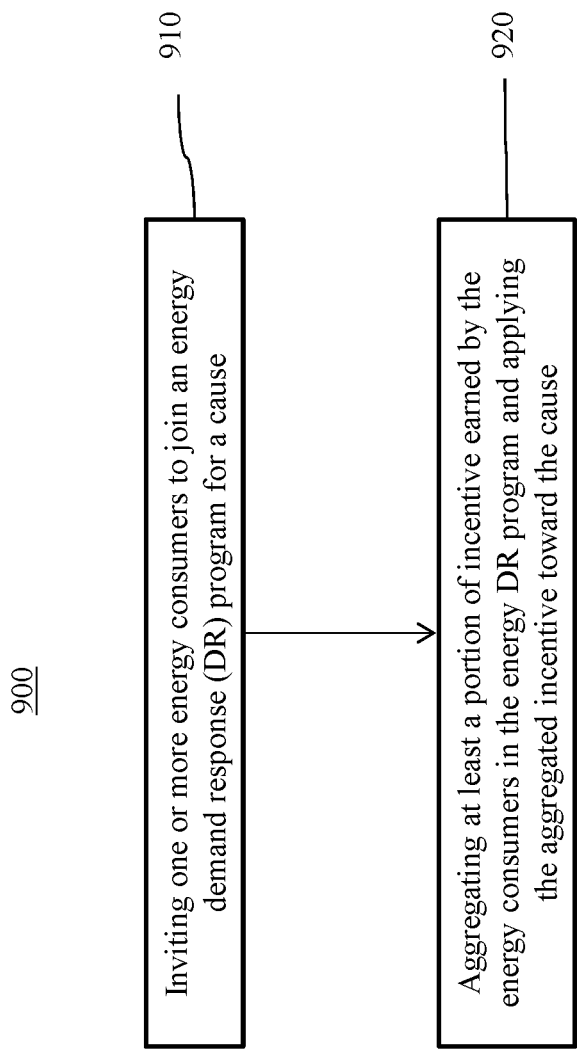
FIG. 13 is an exemplary flow chart illustrating an embodiment of a method for collecting crowd-source funding using the system of FIG. 12.

Turning to FIG. 13, a method 3000 for collecting crowd-source-funding is shown. The method 3000 can be implemented by the DR Aggregator 500 or the Crowd-Source Organization 500A (shown in FIG. 12). One or more energy consumers are invited, at 910, to join an energy demand response (DR) program for a cause. At least a portion of incentive earned by the energy consumers in the energy DR program is aggregated, at 920. The aggregated incentive can be applied toward the cause.

In one example, the Crowd-Source Organization 500A can comprise a school district that may desire to raise money to install solar panels at schools within the school district. Participating consumers can, by simply modifying behavior for the period of the fund raising effort, direct at least a portion of the aggregate benefit from the Distribution Operator 300 for the demand reductions to the Crowd-Source Organization who can provide the public benefit (in this example, install the solar panels at the schools).

In another example, the DR Aggregator 500 with Direct Access owns a big data center. The crowd-source goal can include getting solar panels installed on the roof of every school in a district. The crowd-source program can last for one summer. Consumers can sign-up easily with consumer devices 400, such as smart phone using the DR Locational Application 200. With participation of sufficient number of consumers, peak-hour load can be reduced by a certain amount. For example, the peak-hour load can be reduced by 120 Megawatt-hours (MWh). Individual consumers that respond to the incentive in energy consumption behavior can have an electric bill that is lowered. The DR Aggregator 500 can save significant amount of money on the data center electric bill during summer peak hours. The DR Aggregator 500 can pass a certain portion of the DR payment from utility (such as distribution operator 300) to the school district. The school district can get solar panels installed.

As an additional benefit, new solar panels can lead to lower off-peak costs. DR can lead to a greater energy savings in the next year. All roles working with the DR Locational Application 200 (in FIG. 11 and FIG. 12) can thus make contribution to achieve goal of reducing greenhouse gas (GHG).

In some embodiments, the credits and demerits (shown in FIG. 7) can be earned as "points" which are unitless and whose value may differ between DR Aggregators 500 and/or crowd-source organizations 500A. Accumulation of the points may, or may not, go negative depending upon the program accepted by the consumer. In an example for crowd-source funding, negative and positive points can affect the entire pool and therefore push participants to change the consumption behavior in such a way as to not impede the group goal. In an example for an individual consumer participating with an aggregator, negative points would only cancel out to a zero balance over time but do not necessarily create a position that causes the consumer to have to pay the DR Aggregator 500.

The disclosed system and method provide a simple DR Locational Application platform that can support load-modifying DR at the circuit level of any number of distribution operators 300 regardless of size, organization, or market participation. The method also provides a simple and transportable platform for consumers to participate with or without changing the time periods for energy consumption.

The disclosed system and method can incentivize consumer behavior on a mass scale, specifically at the distribution circuit level, and take advantage of locational services, load shifting battery capabilities, and wireless communication capabilities of most smart mobile devices.

The disclosed system and method manage DR as demand-side management, where load modifier, such as individual mobile device users, who may not be in wholesale market or DR management. Users of smart phone app are often motivated to participate in actions of certain causes in mass with a small incentive. The disclosed method simplifies DR management. For example, the distribution operator 300 can provide load/neutral/no-load values for selected regions (or the substation-feeder areas) to the DR Locational Application 200. The DR Locational Application 200 can match location of the consumer device 400 by GPS. The DR Locational Application 200 can calculate contribution of energy consumption reduction by location of the consumer device 400. Individual users can thus easily be incentivized to modify behavior.

Additionally and/or alternatively, the DR Locational Application 200 can display selected statistics to engage the consumer, such as the consumer's individual credits on a periodic, such as daily, monthly, or annually, and/or the contributions of all participants at both the DR Aggregator and/or Crowd-Source Organization level and the entire DR Locational Application level. Such information can be displayed in terms of energy consumption that is reduced and estimated Green House Gas emissions that are reduced. For example, the energy consumption can be expressed in unit of MWh. For consumers participating in crowd-source funding, such information can also be vital to seeing the consumers' personal and global progress of the crowd-sourcing efforts.

In one embodiment, the DR Locational Application 200 can associate the consumer device 400 with the DR aggregator 500 based on the selected region 212. Additionally and/or alternatively, the DR Locational Application 200 can associate the consumer device 400 with a different DR aggregator 500 upon determining that the consumer device 400 is moved out of the selected region 212. The different DR aggregator 500 can be selected based on an updated location of the consumer device 400.

Since the locational service of the consumer device 400, such as GPS, can provide location of the consumer device 400 to the DR Locational Application 200 in real-time, a consumer can participate while traveling among regions 212 (shown in FIG. 2) and even when traveling to service territory of another distribution operator 300. In that case, the DR Locational Application 200 can look for a default DR Aggregator 500 of the traveling consumer within the new service territory. If the default DR Aggregator 500 is found, then any earned credits and/or demerits can be applied directly to the s account of the traveling consumer, even though the consumer is traveling outside his home territory. Based on choice of the DR Aggregators 500, an agreement can be reached, where service territories do not overlap, to automatically honor the credits of customer of another DR aggregator 500, when that customer is traveling in the service territory of that DR aggregator 500. For example, the DR Locational Application 200 can associate the consumer device with a default DR aggregator upon determining that the location of the consumer device 400 is in a territory of the DR aggregator 500. The DR aggregator 500 can remain associated with the consumer device 400 even when the consumer device 400 has moved out of the territory of the DR aggregator 500. Stated somewhat differently, the DR aggregator 500 can continue to provide incentive to the consumer device 400. Additionally and/or alternatively, the DR Locational Application 200 can associate the consumer device 400 with a different DR aggregator 500 upon determining that the consumer device 400 is moved into a territory of the different DR aggregator 500 and out of the territory of the prior DR aggregator 500. Stated somewhat differently, the different DR aggregator 500 can start to provide incentive to the consumer device 400. Thereby, the DR Locational Application 200 can become a global platform that can be easily expandable.

Thus, the DR Locational Application 200 can provide solutions to the technical problems of shifting energy consumption from high-demand time periods to low-demand time periods. In various embodiments, the DR Locational Application 200 can provide an applicable local schedule 214 to the consumer device 214. The consumer device 400 can thus charge or not charge according to the local schedule 214, and/or control associated appliance 400A according to the schedule. Energy consumption activity can be provided from the consumer device 400 to monitor status of DR. Load can thus be managed at individual level and distribution circuit level. Peak-hour energy consumption, energy cost, and greenhouse gas emission can be reduced. The DR Locational Application 200 can further contribute to advancement of power management, load distribution management, as well as automation control technology.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for managing demand response (DR), comprising:
    obtaining, by a processor of a computing device, a local schedule of one or more states for energy consumption on distribution circuits within a selected region served by a distribution operator, the local schedule associating respective time periods with the one or more states including a load state, an unload state, or a combination thereof;
    obtaining, by the processor, location information associated with a consumer device, wherein the location information is based on information generated by a locational tracking device integrated onboard the consumer device;
    determining, by the processor, that the consumer device is located in the selected region based on the location information;
    sending, by the processor, a reward incentive plan generated for the consumer device based on the local schedule;
    instructing, by the processor, the consumer device to consume energy during the time period corresponding to the load state and not to consume energy during the time period corresponding to the unload state based on the local schedule;
    determining, by the processor, energy consumption of the consumer device during the load state or the unload state based on energy consumption activity data received from the consumer device;
    assigning, by the processor, a reward to the consumer device based on the reward incentive plan and the determined energy consumption activity data of the consumer device; and
    modifying, by the processor, account information associated with the consumer device in response to assigning the reward to the consumer device.

2. The method of claim 1, wherein the load state of the local schedule is associated with a first time period corresponding to a historically low-demand period in the selected region and the unload state of the local schedule is associated with a second time period corresponding to a historically high-demand period in the selected region.

3. The method of claim 1, further comprising:
    receiving, by the processor, the energy consumption activity data associated with the consumer device from the consumer device; and
    determining, by the processor, an action of energy consumption associated with the consumer device within at least one of the time periods in the local schedule based on the energy consumption activity data received from the consumer device.

4. The method of claim 3, wherein determining the action of energy consumption associated with the consumer device within at least one of the time periods in the local schedule based on the energy consumption activity data received from the consumer device comprises:
    determining that an action of charging the consumer device occurred within at least one time period of the local schedule; or
    determining that an action of not charging the consumer device occurred within at least one time period of the local schedule.

5. The method of claim 3, wherein the energy consumption activity data received from the consumer device includes an action of energy consumption by an appliance in communication with the consumer device.

6. The method of claim 3, wherein the energy consumption activity data includes an action of energy consumption by an appliance being controlled by the consumer device at least partially based on the local schedule.

7. The method of claim 1, wherein assigning the reward to the consumer device comprises:
    assigning a positive reward to the consumer device when the energy consumption activity data includes information indicating that an action of consuming energy during the time period corresponding to the load state, an action of not consuming energy during the time period corresponding to the unload state, or a combination thereof.

8. The method of claim 1, wherein assigning the reward to the consumer device comprises:

assigning a negative reward to the consumer device when the energy consumption activity data includes information indicating that an action of consuming energy during the time period corresponding to the unload state, an action of not consuming energy during the time period corresponding to the load state, or a combination thereof.

9. The method of claim 1, further comprising:
reporting, by the processor, the reward assigned to the consumer device to a DR aggregator,
wherein the DR aggregator provides an incentive to an energy consumer associated with the consumer device based on the reward.

10. The method of claim 9, further comprising:
identifying, by the processor, the DR aggregator to report the reward assigned to the consumer device based on the location information associated with the consumer device; and
associating, by the processor, the consumer device with the identified DR aggregator.

11. The method of claim 10, wherein:
obtaining location information associated with the consumer device comprises:
obtaining first location information associated with the consumer device; and
obtaining second location information, different from the first location information, associated with the consumer device; and
identifying the DR aggregator to report the reward assigned to the consumer device based on the location information associated with the consumer device comprises:
identifying a first DR aggregator in response to obtaining the first location information associated with the consumer device; and
identifying a second DR aggregator in response to obtaining the second location information associated with the consumer device.

12. The method of claim 1, wherein the reward is associated with an energy DR program for a cause.

13. The method of claim 12, further comprising sending, by the processor, a report indicating that the reward is assigned to the consumer device to a DR aggregator associated with the energy DR program,
wherein the DR aggregator determines an incentive based on the reward assigned to the consumer device and a reward assigned to each of a plurality of consumer devices associated with the energy DR program for the cause, and
wherein the incentive is applied to the cause.

14. The method of claim 1, wherein obtaining the local schedule of the one or more states for energy consumption on the distribution circuits within a selected region served by the distribution comprises obtaining a master schedule comprising a plurality of local schedules each associated with a different selected region served by the distribution operator.

15. The method of claim 14, wherein the master schedule is received by the processor of the computing device from the distribution operator in a Geographical Information System (GIS) format.

16. The method of claim 1, wherein assigning a reward to the consumer device based on the reward incentive plan and the energy consumption activity data comprises providing an incentive based on the reward assigned to the consumer device.

17. The method of claim 16, wherein modifying the account information associated with the consumer device comprises modifying the account information associated with the consumer device to reflect one or more of an on-line credit, a discount, a contribution to a limited-time crowd-source funding effort, or a contribution to a cause based on the incentive associated with the reward assigned to the consumer device.

18. The method of claim 1, wherein the computing device is a server.

19. The method of claim 1,
wherein the computing device is the consumer device, and
wherein sending, by the processor, the local schedule to the consumer device for instructing the consumer device to consume energy during the time period corresponding to the load state and not to consume energy during the time period corresponding to the unload state comprises the processor controlling the consumer device to consume energy during the time period corresponding to the load state and not to consume energy during the time period corresponding to the unload state.

20. A system for managing demand response (DR), comprising:
a consumer device comprising a processor and a location tracking device; and
a server comprising a processor, wherein the server processor is configured to:
obtain a local schedule of one or more states for energy consumption on distribution circuits within a selected region served by a distribution operator, the local schedule associating respective time periods with the one or more states including a load state, an unload state, or a combination thereof;
obtain location information associated with the consumer device, wherein the location information is based on information generated by the locational tracking device;
determine that the consumer device is located in the selected region based on the location information;
send a reward incentive plan generated for the consumer device based on the local schedule;
instruct the consumer device to consume energy during the time period corresponding to the load state and not to consume energy during the time period corresponding to the unload state based on the local schedule;
determine energy consumption of the consumer device during the load state or the unload state based on energy consumption activity data received from the consumer device;
assign a reward to the consumer device based on the reward incentive plan and the energy consumption activity data of the consumer device; and
modify account information associated with the consumer device in response to assigning the reward to the consumer device.

21. The system of claim 20, wherein the processor is further configured to assign a reward to the consumer device based on the reward incentive plan and the energy consumption activity data that includes providing an incentive based on the reward assigned to the consumer device.

22. The system of claim 21, wherein the processor is further configured such that modifying the account information associated with the consumer device comprises modifying the account information associated with the consumer device to reflect one or more of an on-line credit, a discount, a contribution to a limited-time crowd-source funding effort, or a contribution to a cause based on the incentive associated with the reward assigned to the consumer device.

23. A method for managing demand response (DR) via a consumer device having a locational tracking device integrated onboard, comprising:
   sending, by a processor of the consumer device, location information associated with a location of the consumer device to a DR Locational Application, the location information being generated by the locational tracking device;
   obtaining, by the processor from the DR Locational Application, a local schedule of one or more states for energy consumption on distribution circuits within a selected region served by a distribution operator associated with the location of the consumer device, the local schedule associating respective time periods with the one or more states including a load state, an unload state, or a combination thereof, wherein the local schedule instructs the consumer device to consume energy during the time period corresponding to the load state and not to consume energy during the time period corresponding to the unload state;
   receiving, by the processor, a reward incentive plan generated for the consumer device based on the local schedule; and
   sending, by the processor, energy consumption activity data to the DR Locational Application, the energy consumption activity data including an action of energy consumption associated with the consumer device within at least one of the time periods in the local schedule and information associated with energy consumed by the consumer device during the load state or the unload state according to the local schedule,
   wherein the DR Locational Application modifies account information associated with the consumer device in response to assigning a reward to the consumer device based on the reward incentive plan and the energy consumption activity data received from the consumer device.

24. The method of claim 23, further comprising controlling, by the processor, energy consumption by the consumer device by charging a battery of the consumer device at least partially based on the local schedule, displaying, by the processor, the local schedule on a display device of the consumer device for presentation, or a combination thereof.

25. The method of claim 23, further comprising controlling, by the processor, energy consumption of an appliance in communication with the consumer device at least partially based on the local schedule.

26. The method of claim 23, wherein assigning a reward to the consumer device based on the reward incentive plan and the energy consumption activity data comprises providing an incentive based on the reward assigned to the consumer device.

27. The method of claim 26, wherein providing an incentive modifying the account information associated with the consumer device comprises modifying the account information associated with the consumer device to reflect one or more of an on-line credit, a discount, a contribution to a limited-time crowd-source funding effort, or a contribution to a cause based on the incentive associated with the reward assigned to the consumer device.

\* \* \* \* \*